May 5, 1953        L. A. MORRELL        2,637,043

OCULAR PROSTHESIS

Filed Sept. 28, 1948

INVENTOR
LEON A. MORRELL
BY
William F. Mesinger
ATTORNEY

Patented May 5, 1953

2,637,043

UNITED STATES PATENT OFFICE 2,637,043

OCULAR PROSTHESIS

Leon A. Morrell, Mount Vernon, N. Y.; Lillian Magdalene Morrell, executrix of said Leon A. Morrell, deceased, assignor of one-half to Edwin H. Erickson, Teaneck, and one-half to Emanuel Rosen, Newark, N. J.

Application September 28, 1948, Serial No. 51,570

7 Claims. (Cl. 3—13)

This invention relates to ocular prosthesis and more particularly to means of providing natural mobility of artificial eyes.

Various expedients have been tried to provide the outer removable part of an artificial eye with movement to simulate the natural movement of an eye. Some limited amount of movement has been attained by providing a mechanical connection between the artificial eye shell and an inner portion that is surgically implanted in the eye socket. The results have not been all that is desired particularly as to degree and naturalness of motion and facility of fitting.

Principal objects of the present invention are to provide an improved ocular prosthesis having natural like mobility; to provide improved means for transmitting motion of eye muscles to a removable artificial eye element; to provide an improved combination of implant and outer eye element whereby eye muscle movements imparted to the implant are faithfully transmitted to the outer eye element; to provide an improved implant or surgical element whereby eye tissue and/or muscle attachment thereto is facilitated; to provide an artificial eye combination including an improved surgical unit for implanting in an eye socket which unit is constructed to facilitate the attachment thereto of tissue and/or muscle so that a high degree of controlled mobility may be imparted to the implant, and magnetic means so constructed and arranged to transmit movements of the implant to the anterior technical or artificial eye unit to provide a wide degree of natural controlled mobility of the technical unit, which means also provides for the ready removal, replacement or adjustment of the technical unit.

These and other objects and advantages of the invention will become apparent from the following description and the accompanying drawing in which.

According to the present invention, magnetic elements are so associated with the surgical unit or implant and the technical unit that movements of the surgical unit are transmitted by magnetic force to the technical unit so that the artificial eye is endowed with practically natural movement under the control of the wearer.

Either the magnetic element associated with the implant or that associated with the technical unit may be a permanent magnet and the element associated with the opposite unit may be of magnetically attracted material. It is usually preferable in most instances to have both elements of permanent magnetic material with the juxtaposed magnetic poles of opposite polarity. It is thereby possible to obtain the desired strength with a small total amount of magnetic material. The posterior magnet is preferably disposed within the implant so that only the magnetically active poles are adjacent to the anterior face of the implant. The implant is also provided with annularly arranged means for facilitating the attachment of eye muscles and/or tissue so that the eye muscles will positively and controllably move the implant. Preferably the opposed magnetic poles are not in actual contact with each other and a non-magnetic material may be interposed between the magnetic elements.

Figure 1:
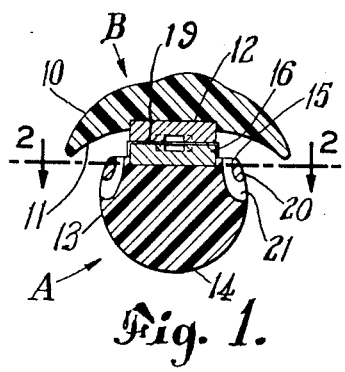
Fig. 1 is a view of a mid-section through one embodiment of an implant or surgical unit operatively associated with an artificial eye or technical unit according to the principals of the invention.

Referring now to the drawing and particularly to Fig. 1, the surgical unit or implant is indicated generally at A and the technical artificial eye unit is indicated at B. These are shown substantially associated as they would be in use, except that the eye tissues are not indicated for the sake of clearness of drawing.

The technical unit comprises a shell like body portion of the customary type having a contour that is usually custom made to fit the wearer and having an anterior or external appearance that as closely as possible simulates a natural eye for the wearer. Such technical unit bodies are made of glass or plastic compositions, the latter being preferable. The technical unit has a posterior or inner surface 11 to which may be secured a magnetic element 12 of suitable shape. The element 12 may be a magnetically attracted material such as iron or it may be permanently magnetic. Its thickness however is preferably less than its other dimensions so that the technical unit is held at the desired distance in front of the surgical unit A. The magnetic element 12 may be secured to the body 10 in any suitable manner such as by cementing and/or by setting it part way into the surface 11.

The surgical unit comprises a main body portion 13 having a generally spherical shape including a rounded posterior portion 14 and a flattened anterior surface 15. It is important that the material of which the body 13 is made should be fully compatible with human tissue so that it may be permanently implanted in an eye socket. It is also preferable that the material should be non-magnetic. Certain metals could be used as for example, gold, or corrosion resistant cobalt and chromium alloys but it is preferable to employ a plastic having suitable properties as for example, the acrylics, acrylate and methacrylate, methyl-methacrylate, and polyethylene.

Within the body 13 is disposed a magnetic element 16 which is preferably of the permanent magnetic type. The element 16 can be incorporated by molding the plastic around it or it can be inserted into a bore 17 extending inwardly from the face 15. The magnetically active parts or poles 18 of the element 16 are adjacent to the face 15 and if flush with the face, may be covered by a thin diaphragm or plate 19 of non-magnetic material such as plastic sealed to the body 13 at its edges. If the magnetic element extends above the surface 15, a plastic cap may be employed to cover the pole surfaces. The surgical unit A is also provided with means for facilitating the securement thereto of tissues or eye muscles.

Figures 2, 3:
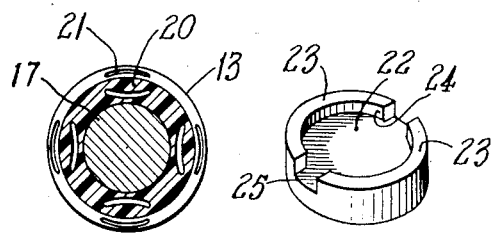
Fig. 2 is a view of a section through the surgical unit taken on the line 2—2 of Fig. 1.
Fig. 3 is a perspective view of a permanent magnetic element securable in the surgical unit and/or to the technical unit.

One form of such means is illustrated in Figs. 1 and 2 and may comprise an annularly arranged series of loops or bridges 20 spanning slots 21 that are formed or cut rearwardly and then outwardly in the body 13 from the face 15. Eye muscle tissues may be drawn and secured around the bridges 20 by the surgeon.

The particular form of magnetic elements illustrated in Fig. 1 at 12 and 16 are bi-polar and circular. One modification is shown in Fig. 3 wherein the main part of the element comprises a disk portion 22 and raised pole portions 23 on one side of the disk 22, the pole portions 23 being formed by a shallow counterbore 24 and a diametral slot 25 leaving arcuate poles 23 for forming the active magnetic face of the element. The material of which the magnetic element is formed may be an alloy steel having a high degree of permanent magnetism but is preferably a highly magnetized alloy such as; 16% cobalt, 9% chromium, 1 to 1.5% molybdenum 38% cobalt, 5% chromium, 4% tungsten
20% nickel, 12% aluminum, 5% cobalt
17% nickel, 10% aluminum, 12% cobalt, 6% copper
25% nickel, 12% aluminum
28% nickel, 12% aluminum, 5% cobalt The last three having the higher strength are more suitable because a desirably small size magnetic element will provide adequate magnetic attraction between the units A and B. Material having still greater permanent magnetic coercive force may be used.

Figure 5:
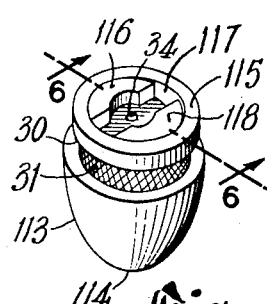
Fig. 5 is a perspective view of another embodiment of a surgical unit according to the invention in which is secured a magnetic element similar to that of Fig. 3.
Figure 6:
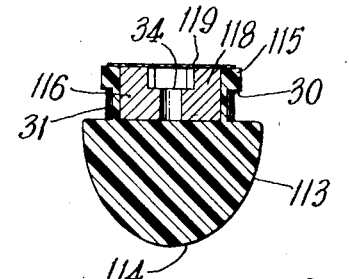
Fig. 6 is a view of a section taken on the line 6—6 of Fig. 5.

Another modification of the implant unit A is shown in Figs. 5 and 6 wherein the body 113 is formed of a plastic such as polyethylene. This has a rounded or hemispherical posterior 114 and a flat anterior face 115. An inward bore 117 forms a receptacle for a magnetic element 116 which is inserted deep enough so that its pole faces 118 are flush with the face 115 and a thin plastic diaphragm 119 cemented at its edges to the rim of the face 115 seals the magnetic element in the unit. Means for facilitating the attachment of tissue is provided by an annular channel 30, or groove cut in the body 113 close to the face 115 and a band of perforated or woven mesh material 31 that is secured in the groove 30. This mesh material may be of gold, tantalum or an alloy such as one having a composition containing cobalt, chromium, molybdenum, or a woven or perforated plastic. A suitable material is a fine woven mesh of tantalum.

The magnetic element 116 is similar to that shown in Fig. 3 but slightly smaller in diameter and thicker, it being set deeper into the body 113. The poles 118 are thicker and there is a hole 34 through the center the main purpose of which is to eliminate unnecessary metal.

Figure 4:
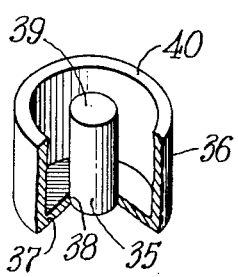
Fig. 4 is a perspective view of another form of magnetic element securable in the surgical unit.

Another style of magnetic element shown in Fig. 4 may be made of a permanent bar magnet 35 mounted axially within a cup 36 of soft iron or steel or preferably magnet steel and having a bottom 37. The end of the bar magnet 35 is secured to the bottom 37 in a suitable manner, for example, by a press fit into a hole 38 in the bottom 37. The maximum diameter of cup is selected according to the available space in the body of the implant and the wall thickness is correlated, according to the magnetic property of the material, with the amount of magnetic flux to be transmitted from the posterior pole of the magnet 35 to the anterior face. In this form of magnet element, therefore one pole 39 is at the anterior end of the bar magnet and the other pole 40 is at the rim of the cup.

Figures 7, 8:
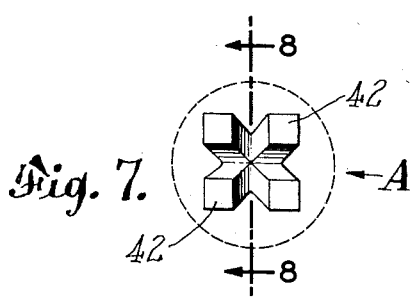
Fig. 7 is a perspective view of still another form of magnetic element securable in an implant.
Fig. 8 is a view of a section taken on the line 8—8 in Fig. 7.
Figure 9:
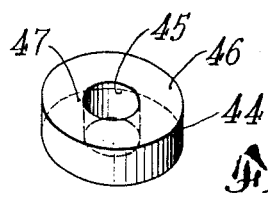
Fig. 9 is a view of still another form of magnetic element securable particularly to the technical unit.

The magnet element illustrated in Figs. 7 and 8 has four poles 42, two of which are north poles and two of which are south poles that extend outwardly from a body portion 43. Such a magnet may be a one piece casting of a suitable alloy and magnetized to a very high permanent flux density. Magnetic elements can also have the form of a simple disk or washer as illustrated in Fig. 9. When this is made of permanent magnet material the disk 44 is provided with a central hole 45 therethrough and magnetized in such a manner that the outer portion 46 forms one annular magnetic pole and the portion adjacent the hole 45 forms the opposite annular pole 47. Such a disk is particularly suitable for mounting on the posterior surface 11 of a technical unit to co-operate with a permanent magnet of the type illustrated in Fig. 4 when the latter is secured in a surgical unit. A disk similar in shape but of soft iron or non-permanent magnet metal may be used as the opposed element for co-operation with the permanent magnet element such as that of Figs. 4, 7 and 8 and Figs. 3, 6 and 7. The magnetic element of Figs. 3, 6 and 7 has the advantage that, as indicated in Fig. 1, the element secured to the technical unit may be a bi-polar permanent magnet similar to that of the surgical unit whereby for a given weight of material an adequately strong mutual attraction is obtained.

By using the more strongly magnetizable alloys the magnetic element can be sufficiently small and compact to be incorporated in the smallest size of surgical unit while providing adequate tractive force between the units. The provision of a diaphragm of non-magnetic material between the units serves not only as a cover for the magnetic element to isolate it from contact with body tissue and fluids but has the advantage of preventing too tight an adherence between the units so that the motion imparted to the technical unit is more natural in that more freedom is permitted for the technical unit to shift in accordance with the contour of the inner surfaces of the eye lids without any binding or restraining effect caused by a mechanical connection. Another advantage is that the technical unit is more easily removable for cleaning. Replacement is easy because the unit is self-adjusting to normal position providing the technical unit has been originally properly fitted and assembled in relation to the surgical unit after the latter has been implanted.

The design of the magnetic elements according to the space and tractive force requirements may be accomplished substantially according to known principals of permanent magnet design.

What I claim is:

1. An implant adapted to be inserted into the inner portion of the socket remaining after the removal of an eye, said implant including a body portion of generally spherical shape provided with an anterior face and a posterior portion and the implant having means for connection with ocular muscles for movement of the implant by the muscles, said implant having a substantially cylindrical well therein extending inwardly a distance from the anterior face thereof and a permanent magnet shaped to fit into the well and fixed therein and having its pole faces effective adjacent the anterior face of the implant.

2. An implant adapted to be inserted into the inner portion of the socket remaining after the removal of an eye, said implant including a body portion of generally spherical shape provided with an anterior surface and a posterior portion and the implant having means for connection with ocular muscles for movement of the implant by the muscles, said implant having a substantially cylindrical well therein extending inwardly a distance from the anterior surface thereof, and a permanent magnet shaped to fit into the well, and fixed therein and having its pole faces extended outwardly beyond the anterior surface of the implant, and a cap of non-magnetic material covering said pole faces.

3. An implant adapted to be inserted into the inner portion of the socket remaining after the removal of an eye, said implant including a body portion of generally spherical shape provided with an anterior surface and a posterior portion and the implant having means for connection with ocular muscles for movement of the implant by the muscles, said implant having a substantially cylindrical well therein extending inwardly a distance from the anterior surface thereof, and a permanent magnet shaped to fit into the well and fixed therein and having its pole faces flush with said anterior surface and a diaphragm of non-magnetic material cemented to said anterior surface and covering the pole faces of the permanent magnet.

4. An implant adapted to be inserted into the inner portion of the socket remaining after the removal of an eye, said implant including a body portion of generally spherical shape provided with an annular anterior surface and a posterior portion and the implant having means for connection with ocular muscles for movement of the implant by the muscles, said implant having a substantially cylindrical well therein extending inwardly a distance from the anterior surface thereof, and a permanent magnet seated in the well and having arcuate pole portions forming a sliding fit with the wall of the well and the pole faces effective adjacent the anterior surface of the implant.

5. An implant adapted to be inserted into the inner portion of the socket remaining after the removal of an eye, said implant including a body portion of generally spherical shape provided with an anterior surface and a posterior portion and the implant having means for connection with ocular muscles for movement of the implant by the muscles, said implant having a substantially cylindrical well therein extending inwardly a distance from the anterior surface thereof, and a permanent magnet seated in the well, said magnet including a circular pole portion having a sliding fit with the wall of the well and the other pole portion comprising a bar located within and concentric with respect to the circular pole portion, the effective pole faces being adjacent the anterior surface of the implant.

6. An implant adapted to be inserted into the inner portion of the socket remaining after the removal of an eye, said implant including a body portion of generally spherical shape provided with an anterior face and a posterior portion and having a substantially cylindrical well therein extending a distance from the anterior face thereof, and a permanent magnet shaped to fit into the well and fixed therein and having its pole faces effective adjacent the anterior face of the implant, and the implant body having a series of slots circumferentially spaced therearound and extending into the implant adjacent the anterior face thereof, and a bridge spanning each of the slots, and each bridge being within the generally spherical outline of the body of the implant providing means for connection with ocular muscles for movement of the implant by the muscles.

7. An implant according to claim 6, wherein the slots extend into the implant rearwardly from the anterior face thereof and outwardly therefrom and through the periphery of the implant rearwardly of the anterior face thereof.

LEON A. MORRELL.

References Cited in the file of this patent

UNITED STATES PATENTS

| Number | Name | Date |
|---|---|---|
| 2,516,804 | Rolf et al. | July 25, 1950 |
| 2,571,721 | Jardon | Oct. 16, 1951 |